(No Model.) 2 Sheets—Sheet 1.
W. H. LEWIS & E. B. BARKER.
PHOTOGRAPHIC CAMERA.
No. 342,211. Patented May 18, 1886.
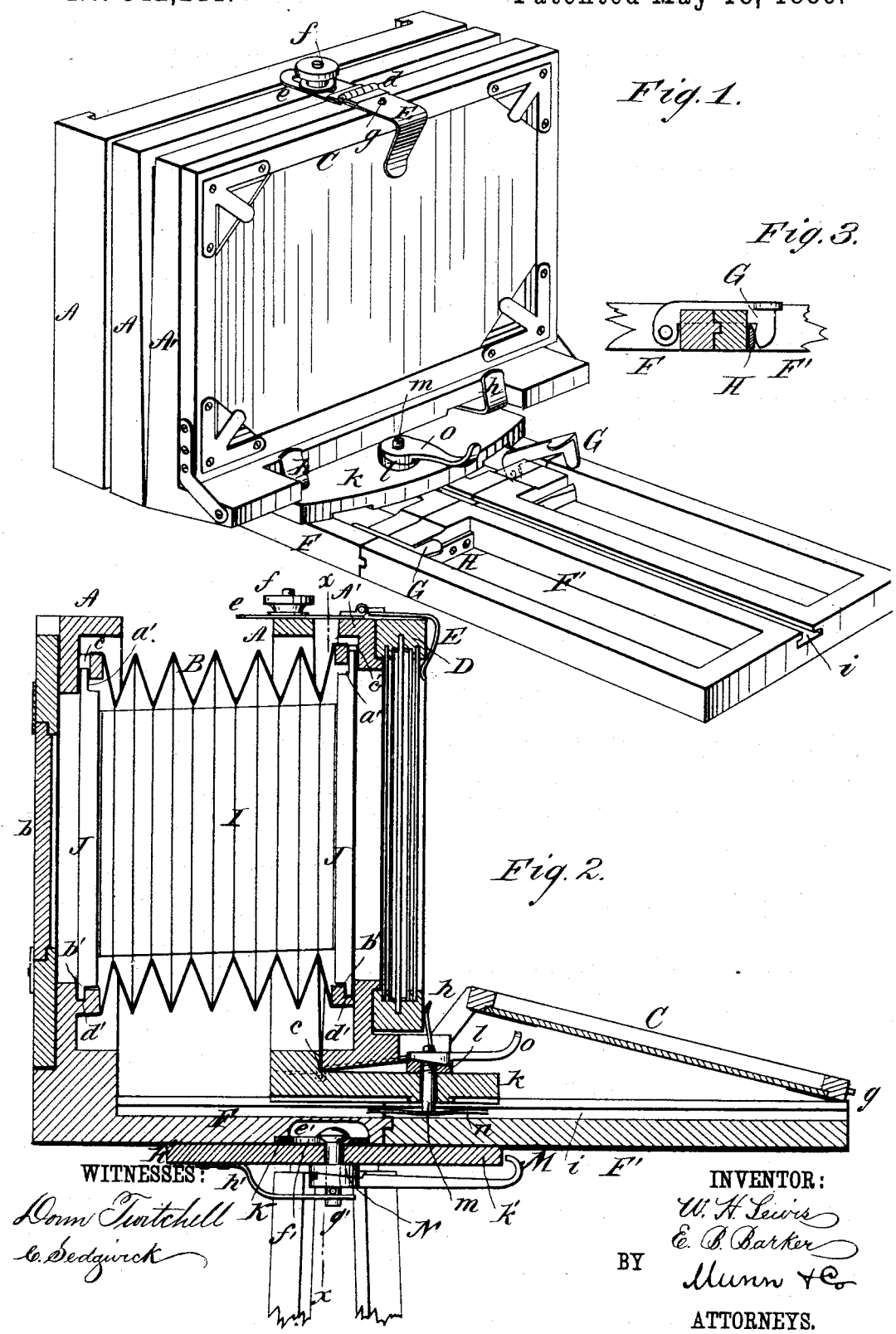
WITNESSES:
Dom Twitchell
C. Sedgwick
INVENTOR:
W. H. Lewis
E. B. Barker
BY Munn & Co
ATTORNEYS.

(No Model.) 2 Sheets—Sheet 2.
W. H. LEWIS & E. B. BARKER.
PHOTOGRAPHIC CAMERA.
No. 342,211. Patented May 18, 1886.
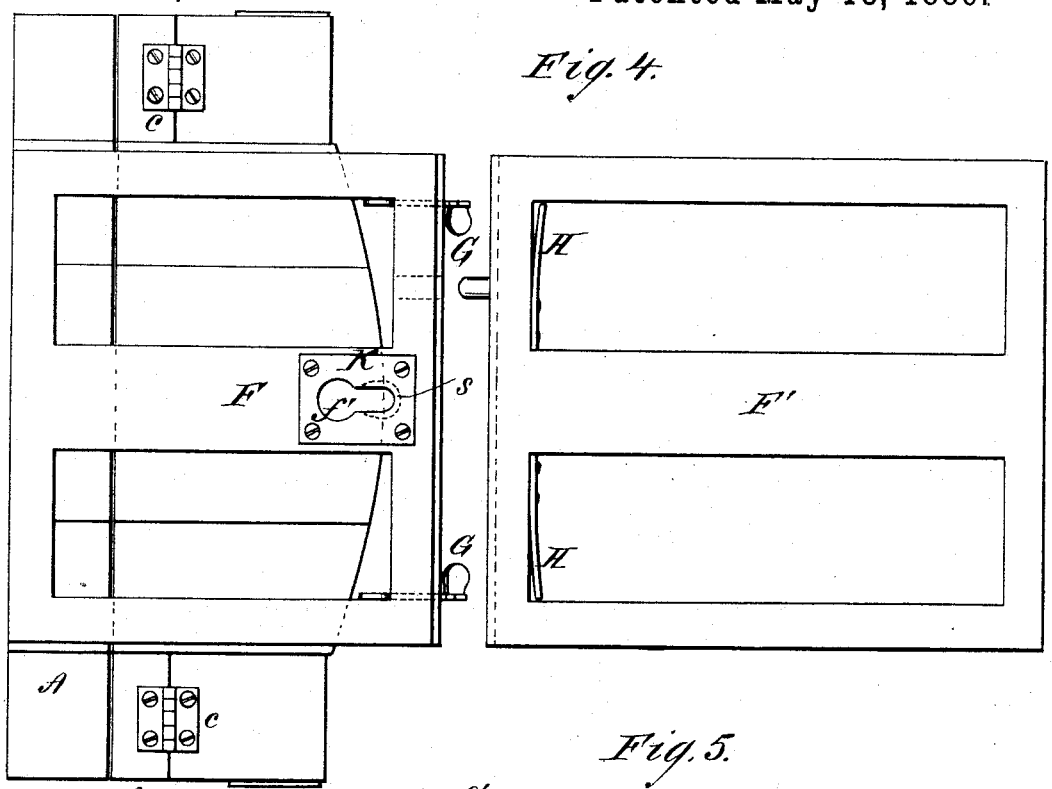
Fig. 4.
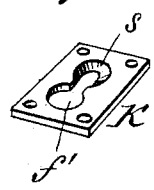
Fig. 6.
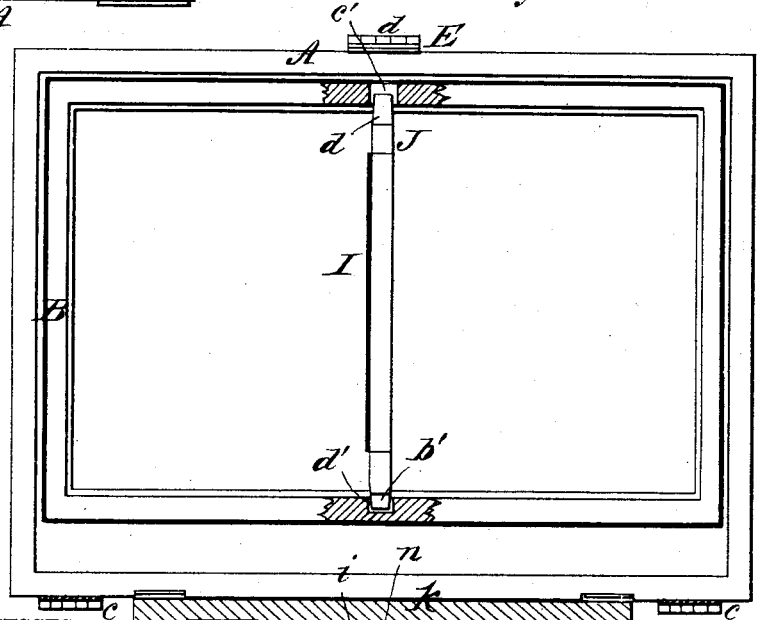
Fig. 5.
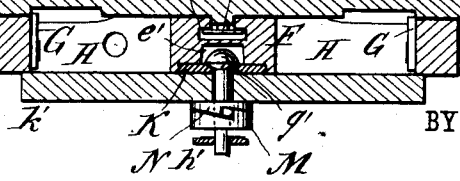
WITNESSES:
Donn Twitchell
C. Sedgwick
INVENTOR:
W. H. Lewis
E. B. Barker
BY Munn & Co.
ATTORNEYS.

UNITED STATES PATENT OFFICE.

WILLIAM H. LEWIS AND ERASTUS B. BARKER, OF NEW YORK, N. Y., ASSIGNORS TO E. & H. T. ANTHONY & CO., OF SAME PLACE.

PHOTOGRAPHIC CAMERA.

SPECIFICATION forming part of Letters Patent No. 342,211, dated May 18, 1886.

Application filed August 20, 1885. Serial No. 174,910. (No model.)

*To all whom it may concern:*

Be it known that we, WILLIAM H. LEWIS and ERASTUS B. BARKER, of the city, county, and State of New York, have invented certain new and useful Improvements in Photographic Cameras and Means for Securing the Same to their Stands, of which the following is a full, clear, and exact description.

This invention consists in certain novel attachments, constructions, and combinations of parts connected with the camera-box and bed or bed-section upon or over which the bellows portion of the camera works, substantially as hereinafter shown and described, and pointed out in the claims.

The invention also includes a novel attachment of a detachable diaphragm used for making stereoscopic pictures, and a novel means of securely holding the camera in its stand, and of providing for its ready detachment when required, as hereinafter set forth.

Reference is to be had to the accompanying drawings, forming part of this specification, in which similar letters of reference indicate corresponding parts in all the figures.

Figure 1 represents a view in perspective of a photographic camera, in part, embodying our invention, with the bellows portion of the camera closed, the plate-holder removed from it, and its ground glass, used in focusing, raised. Fig. 2 is a vertical longitudinal section showing the bellows partly extended; also a plate-holder in position, and means used to secure the camera to its stand. Fig. 3 is a partly-sectional view of certain means for securing a detachable bed-section to the main bed of the camera. Fig. 4 is an inverted view of the camera, in part, and its detachable bed-section. Fig. 5 is a transverse vertical section mainly upon the line $x\,x$ in Fig. 2, and Fig. 6 is a view in perspective of a locking-plate used in securing the camera to its stand.

A A' indicate the main or body part of the frame of the camera, and B indicates the flexible diaphragm or bellows portion connecting the front and rear sections of said frame. The lens or lens-plate is not here shown, but a detachable plate, $b$, is inserted in the front section of the body-frame where the lens-plate would be attached. The rear section of said body-frame is made in two pieces, hinged together, as at $c$, to provide for the tilting, when desired, of the outer back frame-piece, A', against which the hinged ground-glass frame C, used in focusing, rests when closed, or when the ground glass is let down, as shown in Fig. 2, the plate-holder D rests, as usual.

E is a spring holding-hook, hinged, as at $d$, to the top of the rear portion of the body-frame or portion A' thereof, and which may have a front slotted extension, $e$, connecting it by a set-screw, $f$, with the forward piece, A, of the rear part of the main body-frame, to provide for tilting or adjusting the hinged portion A'. This spring holding-hook E engages with a pin, $g$, on the top of the hinged ground-glass frame C, to hold it closed when focusing, as shown in Fig. 1, and when the ground glass is let down, as shown in Fig. 2, said hinged spring holding-hook E bears when closed down over the top and rear of the plate-holder D, as shown in Fig. 2. This does away with all objectionable projections on the plate-holder to secure its retention when in the camera, and forms a quick and easy means of attaching or detaching the plate-holder, which, when inserted to its place, may be held in position below by the usual spring-clamps, $h$, and then the spring holding-hook E shut down over it. Where there are a multiplicity of plate-holders, the advantage of this spring holding-hook E will be more apparent, as the several plate-holders, having no attached locking devices, may be made with perfectly plain and smooth frames.

The camera-bed consists of a front permanently-attached portion, F, and a detachable rear extension or portion, F', which may be fitted to match with the back edge or surface of the portion F, and which is held in engagement therewith by hooks G G, pivoted to the one bed-section and arranged to engage with the frame portion of the other bed-section, or, preferably, with spring take-ups H H thereon, to secure a close connection under all circumstances. This forms a simple, quick, and efficient means of connecting and detaching the removable bed-section F'.

By using a detachable bed-section, F', which may be of any desired length, a great convenience will be afforded in transporting or packing the camera away. Both bed-sections F F' have the central longitudinal groove, i, in their faces for guiding the rear and sliding portion of the camera-frame over the bed; but instead of securing the camera when adjusted on its bed by a set-screw, which is slow and tedious and not always reliable, the sliding foot-piece k of the rear portion of the frame of the camera has mounted on it a fixed cam, l, through which and said foot-piece a screw, m, passes, having on its lower end an elongated or other suitable head, n, that engages with and is free to slide along the walls of the groove i in the bed, and on the upper screw-threaded end of the screw m is fitted a cam-lever, o, arranged to bear down on the fixed cam l. By suitably and only slightly turning this lever o to the right or left the sliding back portion of the camera may be very quickly and readily adjusted backward or forward, and be most securely held to its place on the bed when adjusted.

When requiring to use the camera for taking two pictures side by side—such as used in stereoscopic views—a flexible and extensible corrugated diaphragm, I, is entered centrally within the expanding and contracting body of the camera. To provide for quickly attaching and detaching this dividing-diaphragm, accordingly as it is required to make single or double pictures, said diaphragm is attached at its ends to two rigid uprights or posts, J J, having shouldered ends a' b', adapted to fit freely within recesses or apertures c' d' in the upper and lower portions of the front and rear sections of the main frame. The upper shouldered ends, a', are made longer than the lower shouldered ends, b', so that the diaphragm I, with its attached uprights, may readily be inserted by first entering the upper shouldered ends, a', of each end upright, J, in succession up within the upper apertures, c', of the frame, and then entering or allowing the uprights to drop down within the lower recesses or apertures, d', which still will leave sufficient of the upper shouldered ends, a', within their holding-recesses c'. By raising the uprights to allow of their lower shouldered ends, b', clearing the recesses d', the diaphragm I, with its attached posts, may as readily be disconnected from the main frame of the camera.

The means used for attaching the camera to its stand and for detaching it therefrom, when required, are substantially as follows: In the under side of the bed-section F of the camera is a recess, e', covered by a locking-plate, K, having a key-hole aperture, f', in it for reception and engagement with the plate of the head of a bolt, g', over which the camera is passed and adjusted, so that the head of said bolt will first enter through the enlarged end of the aperture f' in the plate, and then the camera slid or adjusted so that the narrow portion of the slot or aperture f' will embrace the shank of the bolt, the head of which will then be over the narrow end of said slot. This narrow end of the slot f' is chambered or recessed from its inner side, forming a countersink, s, to secure the lock of the head of the bolt with the slotted plate, so that the camera cannot become detached from its stand when said bolt is drawn and held forcibly down. Said bolt g' is drawn down to hold the camera secure on the stand by means of a cam-lever, M, fast on the bolt, which is carried by a spring, h', secured to the under side of the top board or table portion, k', of the stand, the cam-lever M working on the upper face of its cam portion against and under a fixed cam, N, fast to the under side of the board k' of the stand, to draw the bolt down, and the spring h' serving, when the cam-lever is worked back, to raise or release the bolt from its locking hold. This constitutes a quick and secure fastening for the camera to its stand. The locking-plate K virtually forms a locking-recess in the bottom of the camera. In some cases the spring h' may be dispensed with and the cam-bolt g' be raised by the finger of the operator; but we prefer to use the spring.

Having thus described our invention, we claim as new and desire to secure by Letters Patent—

1. The combination, with the rear portion of the frame of the camera, of the upper spring holding-hook, E, adapted to hold with an elastic pressure the plate-holder at or near its top to its place in or against the camera, substantially as specified.

2. The combination, with the permanent bed-section F and the removable bed-section F', constructed to match or engage by tongue and groove with each other at their meeting ends or edges, of the hooks G, for securing said removable section to the permanent bed of the camera, essentially as described.

3. The spring take-ups H, in combination with the hooks G, the permanent bed portion of the camera, and the removable bed-section F', substantially as specified.

4. The combination, with the camera and its slotted bed, of the cam-lever o, the headed screw m, and the fixed cam l, essentially as described.

5. The detachable dividing flexible diaphragm I, having uprights or posts J, provided with shouldered ends a' b', in combination with the camera-frame having recesses or apertures c' d', for the reception of said shouldered ends, substantially as and for the purposes herein set forth.

6. The bottom of the camera provided with a locking-recess, in combination with a headed bolt for connecting the camera with its stand and a cam mechanism for operating said bolt, substantially as described.

7. The combination, with the top board or table portion of the camera-stand, of the headed bolt g', the fixed cam N, and the cam-lever M, substantially as and for the purpose herein described.

8. The combination, with the top board or table portion of the camera-stand, of the headed bolt $g'$, for locking hold or engagement with the camera, the fixed cam N, a spring for raising said bolt, and the cam-lever M, for drawing down or locking said bolt with the camera, essentially as specified.

9. The locking-plate K, applied to the under side of the bed of the camera, and having an irregular-shaped aperture, $f'$, in combination with the cam-lever M, the fixed cam N, the top board, $k'$, of the camera-stand, and the bolt $g'$, having a head adapted to engage with and disengage from the locking-plate, substantially as described.

WILLIAM H. LEWIS.
ERASTUS B. BARKER.

Witnesses:
 EDGAR TATE,
 C. HANFORD HENDERSON.